US 6,725,891 B2

(12) United States Patent
Ledinek et al.

(10) Patent No.: US 6,725,891 B2
(45) Date of Patent: Apr. 27, 2004

(54) MACHINE FOR PROFILE WORKING OF FRONT SURFACES ON OBLONG WOOD WORKPIECES

(76) Inventors: Pavel Ledinek, Pivolska 31, 2000 Maribor (SI); Gregor Ledinek, Janka Serneca 47, 2002 Maribor (SI)

( * ) Notice: Subject to any disclaimer, the term of this patent is extended or adjusted under 35 U.S.C. 154(b) by 0 days.

(21) Appl. No.: 10/283,822

(22) Filed: Oct. 30, 2002

(65) Prior Publication Data

US 2003/0155036 A1 Aug. 21, 2003

(30) Foreign Application Priority Data

Feb. 19, 2002 (SI) ................................................ 0200043

(51) Int. Cl.[7] .......................... B27M 1/00; B27B 31/00
(52) U.S. Cl. .......................... 144/91; 144/2.1; 144/3.1; 144/242.1; 144/90.1; 144/250.23; 144/250.24; 144/245.3; 144/245.1; 144/347; 144/371; 198/456; 198/570; 198/575; 198/598; 198/740; 198/744
(58) Field of Search ...................... 144/2.1, 3.1, 90.1, 144/91, 242.1, 245.1, 245.2, 245.3, 245.4, 250.24, 347, 371; 198/456, 570, 575, 598, 722, 723, 725, 740, 744, 462.2, 803.5; 269/55, 56, 57, 58; 83/411

(56) References Cited

U.S. PATENT DOCUMENTS

| | | | | |
|---|---|---|---|---|
| 3,527,274 A | * | 9/1970 | Kramer et al. ................. | 144/91 |
| 3,685,378 A | * | 8/1972 | Ehm et al. ..................... | 83/411 |
| 3,844,320 A | * | 10/1974 | Dimter ......................... | 144/91 |
| 3,927,705 A | * | 12/1975 | Cromeens et al. ....... | 144/3.1 X |
| 3,961,697 A | * | 6/1976 | Hartman et al. | |
| 4,120,333 A | * | 10/1978 | Hellgren et al. ....... | 144/250.24 |
| 5,617,910 A | * | 4/1997 | Hill ................... | 144/250.14 X |
| 5,911,302 A | * | 6/1999 | Jackson .................. | 144/250.23 |
| 6,082,421 A | * | 7/2000 | Nicol et al. ................ | 144/90.1 |

FOREIGN PATENT DOCUMENTS

| | | |
|---|---|---|
| DE | 41 09 188 | 9/1992 |
| EP | 08 70 584 | 10/1998 |
| WO | PCT/SE97/00234 | 2/1997 |

* cited by examiner

Primary Examiner—W. Donald Bray
(74) Attorney, Agent, or Firm—McGlew and Tuttle, P.C.

(57) ABSTRACT

Machine for profile working of front surfaces on oblong wood workpieces resolves the problem of simple, accurate and fluent or continued working of workpieces front surfaces of various lengths and intersections, and the machine is of a compact construction. It is characteristic by the construction of the entrance turnover device transversely placed between longitudinal conveyors with carriers, which has on the periphery of rotating wheels constructed movable bearing couplings, and by them fixed guiding plates with the groove inside which there are movably inserted guided bearings of bearing couplings. In the area of the entrance turnover device there are placed under an optional angle the oblique roller conveyors, inside which there are flexibly and circularly movably inserted rolls. Between the longitudinal conveyors there is placed the endless conveying chain, which has to its entire extent fastened clamping units that have inside the fixed housing inserted the clamping mechanism, the operation of which is regulated by the control field and control indicator. Over the free corner of the longitudinal conveyor there runs the oblique conveyor with carriers tilted to the longitudinal conveyor. Between longitudinal conveyors there is transversely placed the exit turnover device, which has on the periphery of rotating wheels constructed movable bearing cranks, being through the chain connected with the control chain wheel and control panel, the guided bearing of which is movably inserted inside the channel guide fixed on the rotating wheels.

21 Claims, 13 Drawing Sheets

SECTION: B-B

DETAIL: X

VIEW: "B"

MACHINE FOR PROFILE WORKING OF FRONT SURFACES ON OBLONG WOOD WORKPIECES

FIELD OF INVENTION

The invention relates to a machine for profile working of front surfaces on oblong wood workpieces, and is preferentially a machine to produce toothed or wedge joints on front surfaces of oblong wood workpieces of various lengths and intersections for their later series joining, wherein the entrance and exit turnover device and oblique roller conveyor are integrated, while the conveying chain of adjacent longitudinal conveyors is equipped with movable clamping units.

BACKGROUND OF THE INVENTION

According to the international patent classification this invention belongs to B 27F 1/12, and additionally to B 27F 1/16, B 65 G 17/46, and to B 65G 47/22.

There are quite some known solutions of machines or devices respectively for manufacturing of front surface toothed, wedge joints for series joining of oblong workpieces. According to the oldest known solution the wood workpieces move towards the working unit lineally, in their longitudinal axis direction, they are stopped in front of the working unit and clamped in the clamping device. Thereby, they are placed in the lying position on one of their larger surfaces. Thus clamped, the workpieces then proceed their way through or against, along the vertical or horizontal movable milling working unit, by which we first work one and then another front surface of workpieces, whereby they remain inside the fixed clamping device in the same position.

With another known oldest solution to make profile front surfaces, several workpieces are simultaneously collected by the side guiding lath just before the working unit. There follows activating of the clamping device that simultaneously clamps several workpieces together. Clamped workpieces are then front surface worked, first at one end in the way that the working unit moves lineally along the front surface straightened and steady workpieces. After working, the clamping device is liberated and workpieces proceed their way lineally forward, whereby they are front surface straightened by means of the adjacent conveyor on the opposite, not yet worked end, likewise by means of the side guiding lath. Their clamping and front surfaces working on the other end operations are repeated.

Weakness and deficiency of both previously described oldest known solutions are predominantly in the fact that front surface working of wood workpieces is progressed inside working, interactively interrupted strokes, what entails the working capacity limitation on the machine, as working strokes by themselves define the number of workings in a time unit. It is further also evident that they do not make any accurate positioning or a larger number of workpieces inside the clamping device before and during clamping front surface adjustment feasible, what inevitably causes inaccuracy of profile front surface working, and therewith intolerable discrepancy or aeration inside the built up toothed joint, what entails in not quality finished toothed joints on front surfaces, and the product built up of glued workpieces greater or smaller curvature. Both solutions are also impractical, as they are exclusively applicable for profile working of smaller intersections wood workpieces front surfaces, and do not make such working of workpieces larger intersections feasible.

Pursuant to the Slovenian patent SI 9700042, and pursuant to the European patent EP 0 870 584, the solution of the machine for making toothed or wedge joints in oblong workpieces front surfaces, constructed of the line entrance conveyer, rotating working construction, and line exit conveyer is known. The working construction is constructed in the lying roll form or a rotating drum respectively with the multiple basic surface having clamped units with auxiliary conveyers and adjacent working units placed on the periphery. Workpieces are individually transmitted from the entrance conveyer in the adjacent clamping unit area, which they rigidly clamp them and further circularly convey them passing by working units, and by lagging behind they work each workpiece front surfaces by cutting toothed radial form grooves in them. This known solution weakness and deficiency are above all in the complex and very demanding construction, the capacity of which is limited due to the circular working mode, as well as in the workpieces unreliable transverse shift among working units.

The next known solution is pursuant to the German patent DE 41 09 188, whereby workpieces are one upon another or in a package piled on the horizontal plate that shifts over the rotating axis to an oblique position and lifts the entire package of workpieces into the area of the adjacent working unit. There follows front surface working of each individual workpiece separately. This known solution weakness and deficiency are in the machine capacity limit depending on intermediate operations, the machine does not make the front surface profile working of different lengths and smaller intersections workpieces feasible, and further the working is also lagged behind provided the workpieces are twisted along the longitudinal and/or transversal axis, or otherwise deformed.

The solution pursuant to the international patent PCT/SE97/00234 is also known, whereby workpieces travel individually along the longitudinal conveyer with transverse leaning laths. Thereof, they further pass over to the next conveyer set up in the same direction, and which moves with a bit lower speed. Under both mentioned conveyers there is another, at an angle set third oblique conveyer with special lifting cranks at a fixed distance. In a certain moment each single crank leans under the workpiece that in a given moment travels on another conveyer to its area and is slowly lifting it, and in a defined moment overturns it on the other side. This known solution weakness and deficiency are in the fact that it is exclusively applicable for very flat workpieces of a very low quader form with a large area basic surface, and for low speeds, which all strongly decrease the machine capacity.

All the aforesaid known solutions common characteristics that simultaneously represent an outstanding problem in the profile both sides front surface working of optional lengths and intersections oblong workpieces are above all in working limitation of various intersections and lengths workpieces, in the working stroke procedure, unreliable clamping of workpieces during working, and likewise their conveying and turnover, possibility of frequent stoppages during working owing to deformed workpieces and machine damages in connection with it, as well as a relatively low capacity of these machines.

SUMMARY AND OBJECT OF THE INVENTION

The technical problem being solved by the invention is such a machine construction that will enable simple and continuous front surfaces of oblong and a bit longer wood workpieces profile working, or production of toothed, key front surface joints on both ends of workpieces that will travel through in the flow sequence without intermediate stroke stops, or against adjacent working units, whereby they will rigidly be clamped inside clamping units on the longitudinal conveyors chain, while the position of workpieces before, during and after working will be adjusted by the entrance and exit turnover device and oblique roller conveyor.

According to the invention the problem is solved by the machine for profile working of front surfaces on oblong wood workpieces, essentially constructed of series and parallel set up conveyors, among which an entrance or exit turnover device is preferentially integrated in front of working units, whereby longitudinal conveyors are equipped with conveying chains upon which clamping units for clamping workpieces are fastened, and over them an oblique roller conveyor, and the oblique conveyor serves for redirecting workpieces from one to another row of conveyors. The invention will be more precisely described in a preferential feasibility example, which follows.

The various features of novelty, which characterize the invention, are pointed out with particularity in the claims annexed to and forming a part of this disclosure. For a better understanding of the invention, its operating advantages and specific objects attained by its uses, reference is made to the accompanying drawings and descriptive matter in which a preferential feasibility example of the invention is illustrated.

DESCRIPTION OF THE PREFERENTIAL FEASIBILITY

EXAMPLE

Figure 1:
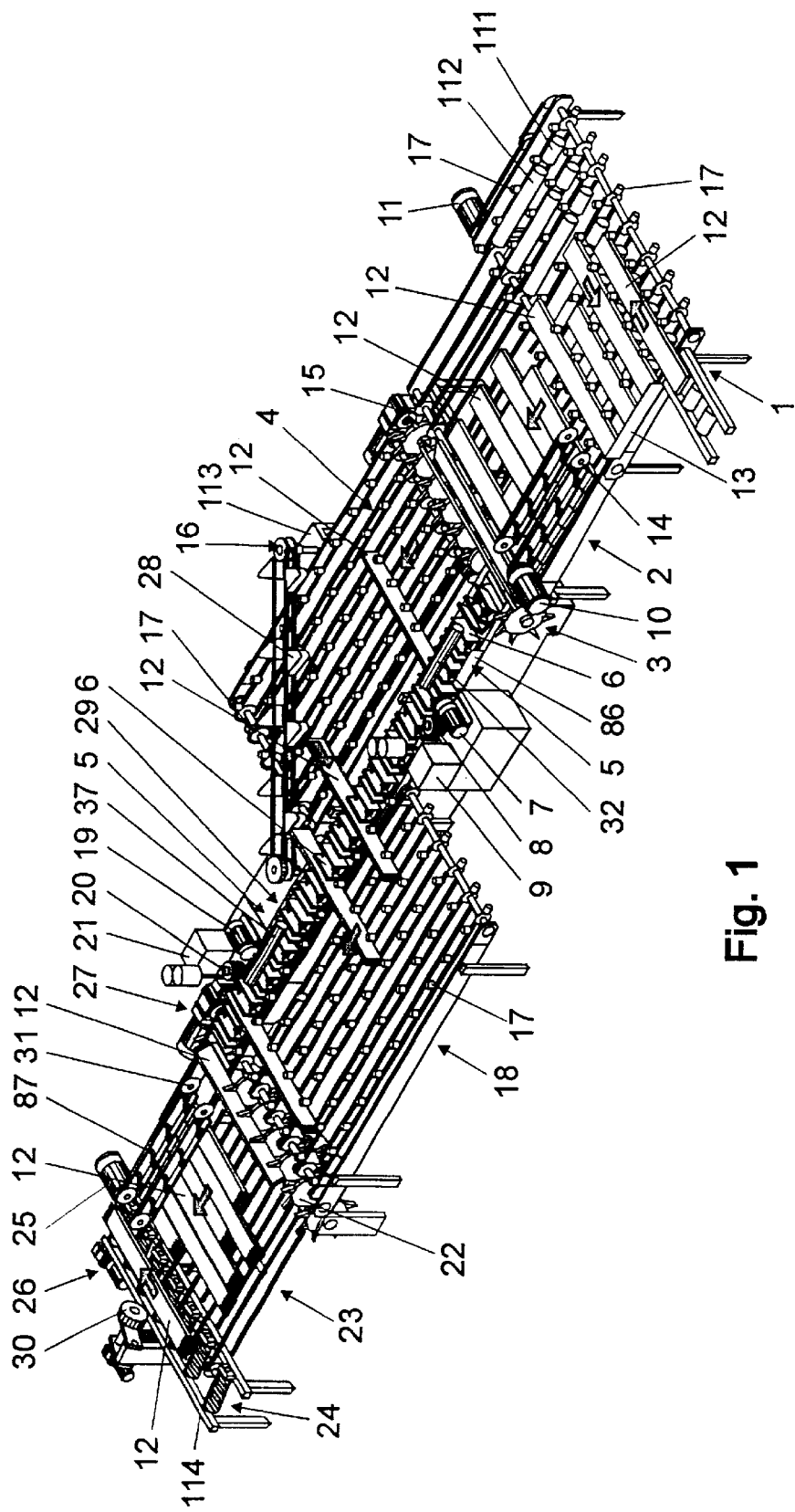
FIG. 1 Machine after the invention in the isometric projection and perspective view.

Turning now to the drawings, and referring first to the FIG. 1, the machine for profile working of front surfaces on oblong wood workpieces is constructed of the transverse set up entrance roller conveyor 1, longitudinal conveyor 2, entrance turnover device 3 structure, oblique roller conveyor 38, longitudinal conveyor 4, endless conveying chain 5 with clamping units 6 and housing 36, circular saw 7, profile miller 8, glue depositor 9, oblique conveyor 16, longitudinal conveyor 18, circular saw 19, profile miller 20, glue depositor 21, exit turnover device 22 structure, longitudinal conveyor 23, transverse roller conveyor 24, and straightening rolls 32 and 37, and is presented in FIG. 1.

The entrance turnover device 3 structure is preferentially formed by the housing 33, rotating wheels 34 with girders 40, guiding plates 45, drive-shaft 35, Cardan joint 39, and bearing coupling 56, presented in FIG. 2 to FIG. 7 inclusive.

The endless conveying chain 5 with clamping units 6 and oblique roller conveyor 38 is presented in FIG. 8 to FIG. 13 inclusive.

The exit turnover device 22 structure is essentially formed by the housing 73 with girders 74, drive-shaft 75 with rotating wheels 76, bearing cranks 77 and channel guide 78, presented in FIG. 14 to FIG. 17 inclusive.

It is evident from FIG. 1 that according to the invention, at the machine start there is located the transverse entrance conveyor 1 constructed of the unmarked housing, inside which there are transversely placed conveying rolls 111 and 112, rotating in the opposite direction, while along one of its longitudinal edge there is fixed the side guiding lath 13.

Close to the entrance conveyor 1 there is placed and fixed to it the longitudinal conveyor 2 with carriers 17 in several parallel rows that are lineally movable in the direction towards the entrance turnover device 3 over the non-presented transmission mechanism. Carriers 17 of the longitudinal conveyor 2 are on one side extended to the area of the entrance conveyor 1 in the way that they run between individual rolls 111 and 112. A bit over the longitudinal conveyor 2 and parallel to it there is placed the belt conveyor 14 with the drive 10.

In the transverse direction and preferentially along its entire width, between the longitudinal conveyor 2 and between the longitudinal conveyor 4 there is circularly rotating placed the entrance turnover device 3 with the drive 15, which rotates counterclockwise and makes a transitional or flow connection. The longitudinal conveyor 4 is equally as the longitudinal conveyor 2 constructed with carriers 17, placed in series and several parallel rows, whereby these rows are preferentially constructed on the same longitudinal axis on both longitudinal conveyors 2 and 4, and the number of rows is also preferentially equal. By one side longitudinal edge of the longitudinal conveyor 4, and by the scarf side edge of the longitudinal conveyor 18 there is lineally flexibly placed the endless conveying chain 5 with clamping units 6 fastened along its entire range that extends from the entrance turnover device 3 to the exit turnover device 22. Over clamping units 6, between the entrance turnover device 3, and between working units along the longitudinal conveyor 4, there is longitudinally placed the rotating straightening roll 32, and the side guiding lath 86 lies by the endless conveying chain 5. Working units are constructed by the circular saw 7, profile miller 8, and glue depositor 9, being in this sequence placed by the endless conveying chain 5, by the longitudinal conveyor 4. The oblique conveyor 16 with carriers 28, driven by the drive 113, is placed at an optional angle over the free angle of the longitudinal conveyor 4.

The longitudinal conveyor 18 that runs parallel to the longitudinal conveyor 4 and partially overlaps with it by length, it has carriers 17 constructed in the equal way as previously described in longitudinal conveyors 2 and 4, whereby longitudinal conveyors 4 and 18 are interactively connected by the intermediate endless conveyor chain 5 with clamping units 6. Working units, side guiding lath 29 and straightening roll 37 are placed by or over the endless conveying chain 5 with clamping units 6 in the way previously described in the longitudinal conveyor 4, but mirror-inverted. Working units in this machine partition are constructed of the circular saw 19, profile miller 20 and glue depositor 21, and are placed by the longitudinal conveyor 18 in the way that they are situated opposite to working units 7, 8 and 9 by the longitudinal conveyor 4.

The exit turnover device 22 with the drive 27 that equally rotates counterclockwise as the entrance turnover device 3 is rotationally placed between the longitudinal conveyor 18 and between the longitudinal conveyor 23 in the transverse direction and along their entire width. The longitudinal conveyor 23 is constructed without carriers, while the belt conveyor 31 with the drive 25 is placed a trifle over and parallel to it, and the side guiding lath 87 under it.

At the free end of the longitudinal conveyor 23, there is in the transverse direction additionally placed the roller conveyor 24 with the drive 26 and conveying wheel 30, which can be shifted along the vertical.

In FIG. 1 shown machine thus presents, according to the invention, the construction of previously stated devices or couplings respectively, whereby working areas are located on the same level or they are situated on the same plane at the transverse entrance conveyor 1, longitudinal conveyor 2, longitudinal conveyor 23, and transverse roller conveyor 24. Working areas of the longitudinal conveyor 4, endless conveying chain 5, and longitudinal conveyor 18 are likewise situated on the same horizontal plane or on the same level respectively, whereby the horizontal plane of the latter is located a trifle higher than the horizontal plane of previously stated structures or devices working areas. The above described is presented in FIG. 3 and FIG. 15. It is also evident from FIG. 1 that the belt conveyor 14, endless conveying chain 5 with clamping units 6, straightening rolls 32 and 37, and belt conveyor 31 are according to the invention constructed inside the machine in the way that they are situated or they run in the same longitudinal axis, which is simultaneously the longitudinal axis of the endless conveying chain 5.

Figure 2:
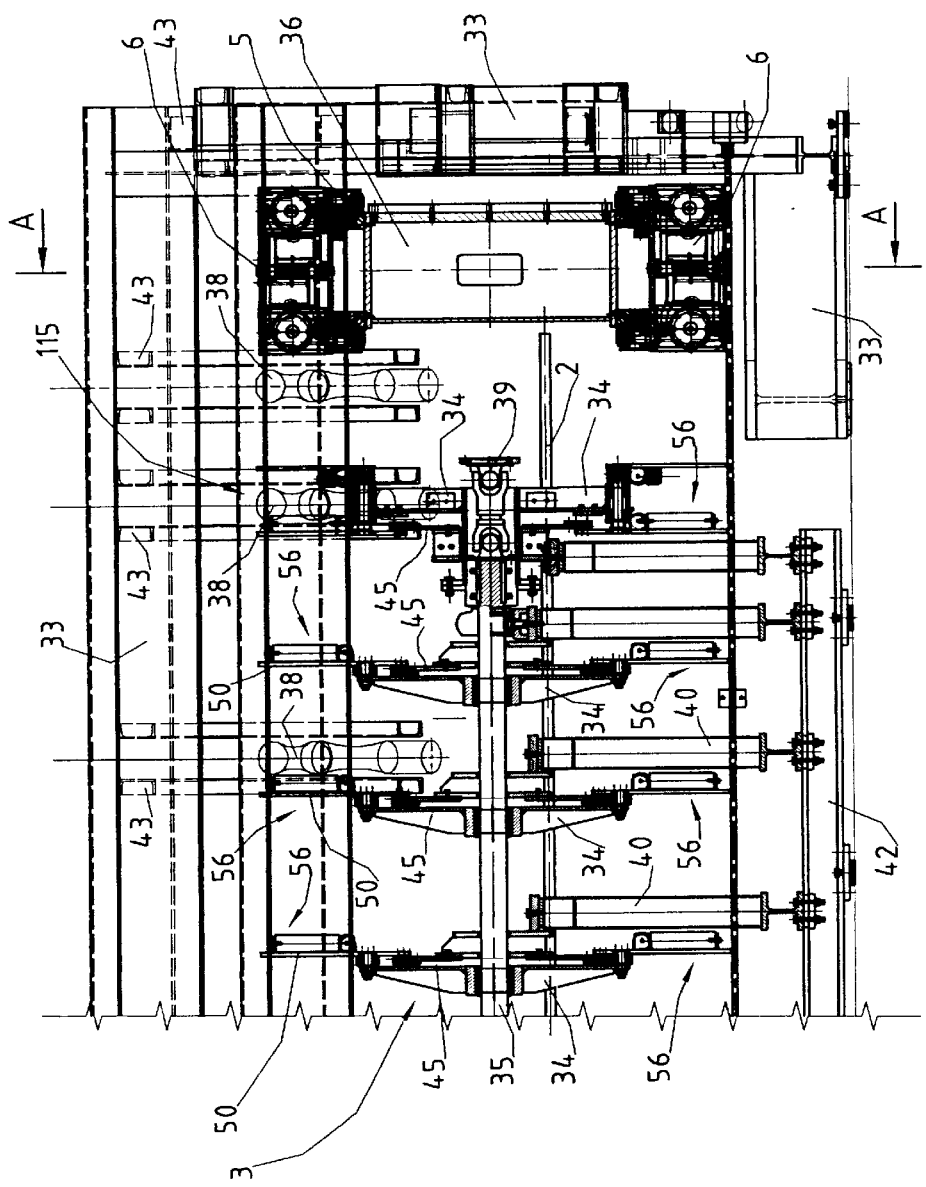
FIG. 2 Entrance turnover device in the partial longitudinal section and plan view.

As previously described in FIG. 1, the entrance turnover device 3 is placed transversely between longitudinal conveyors 2 and 4 in the way that its longitudinal symmetry is situated perpendicular to their symmetry, or is simultaneously situated perpendicular to the endless conveying chain 5 with clamping units 6, and perpendicular to oblique roller conveyors 38, as presented in FIG. 2. It is constructed of the rotating drive-shaft 35, upon which there are at spacing closely put on rotating wheels 34 with adjacent bearing couplings 56 or 115, and with adjacent guiding plates 45, as also shown in FIG. 4. The drive-shaft 35 is rigidly or fixed clamped to the pedestal 42 inside the housing 33 over girders 40. It is in force that to each rotating wheel 34 with bearing couplings 56 and 115 there belong one girder 40 and one guiding plate 45, whereby rotating wheels 34 are fixed to the drive-shaft 35 and rotate together with it, while guiding plates 45 are fixed to adjacent girders 40, and they are idle during the entrance turnover device 3 operation. The Cardan joint 39, being with the other end over an non-presented intermediate element joined with the drive 15, which simultaneously drives the entrance turnover device 3 and endless conveying chain 5 with clamping units 6, is placed at the end of the drive-shaft 35 situated by the endless conveying chain 5. The Cardan joint 39 is fastened to the drive-shaft 35 by an unmarked joining or fixing element. Inside the housing 43 and perpendicular to the drive-shaft 35 of the entrance turnover device 3, as well as perpendicular to clamping units 6 there proceeds the oblique roller conveyor 38, evident also from FIG. 3, the rolls 88 and 89 of which are inside placed along the endless conveying chain 5, and are movably constructed at all three gripping points.

The rotating wheel 34, which is situated on the Cardan joint 39 location, and is simultaneously the first or front in the row of rotating wheels 34 on the drive-shaft 35, has on the entire periphery and in spacing placed bearing couplings 115, while bearing couplings 56 are placed on other rotating wheels 34. The bearing coupling 115 is constructed of vertical, in spacing among them joint and parallel bearing plates 50 and 54. Inside the bearing coupling 115, there is rotationally and horizontally placed the bearing roll 52, and perpendicular to it the rotating leaning roll 41 at the bottom of the bearing plate 50. At the bottom of the bearing plate 54, there is likewise rotationally and horizontally placed the bearing roll 52, and perpendicular to it the rotating leaning roll 53, which is preferentially a trifle shorter than the opposite to it placed leaning roll 41. Bearing couplings 56 constructed on other rotating wheels 34 are open constructions and formed by the three-side bearing plate 50 with an unmarked L-cut, at the bottom of which there is rotationally and horizontally placed the bearing roll 52, and likewise perpendicular to it the rotating leaning roll 41. A rule is applied that all leaning rolls 41 are placed by the vertical wall of the adjacent bearing plate 50 cut that is situated towards the Cardan joint 39 direction or towards the entrance turnover device 3 rotation direction, what is in detail presented in FIG. 5, FIG. 6 and FIG. 7. Bearing couplings 56 are radially movably fastened to the adjacent rotating wheel 34 in the rotating point 57, located on one shorter side of the bearing plate 50. The guided bearing 58 is likewise radially movably placed on its opposite shorter side. Each rotating wheel 34 in the row of the entrance turnover device 3 can have an optional number of bearing couplings 56, whereby a rule is applied that the number of bearing couplings 56 is equal on all rotating wheels 34, and that they are located about the same parting circle, what is equally valid for the number of bearing couplings 115.

As already above stated and presented in FIG. 3, FIG. 5, FIG. 6 and FIG. 7, by one larger surface of each rotating wheel 34 there is placed the guiding plate 45, fixed to the adjacent girder 40, of an optional irregular form with the radial, partially corrugated edge, which in its major extent is rounded up by the groove 59 of the identical form. All guiding plates 45 with the scarf groove 59 are on all rotating wheels 34 of the completely equal form, equal dimensions, and are also in the equal way placed and positioned along them. Rotating wheels 34 are preferentially of the circular surface form, and can be in some other construction example also of other regular or irregular geometrical forms. In rotating the entrance turnover device 3, and thus rotating wheels 34 with bearing couplings 56 or 115, their guided bearing 58 travels along the entire extent of the adjacent guiding plate 45, i.e. on its free edge, as well as inside the groove 59. Adequately is adjusted and altered the position or standing respectively of any single bearing coupling 56 or 115 in the row on the rotating wheel 34.

Figure 12:
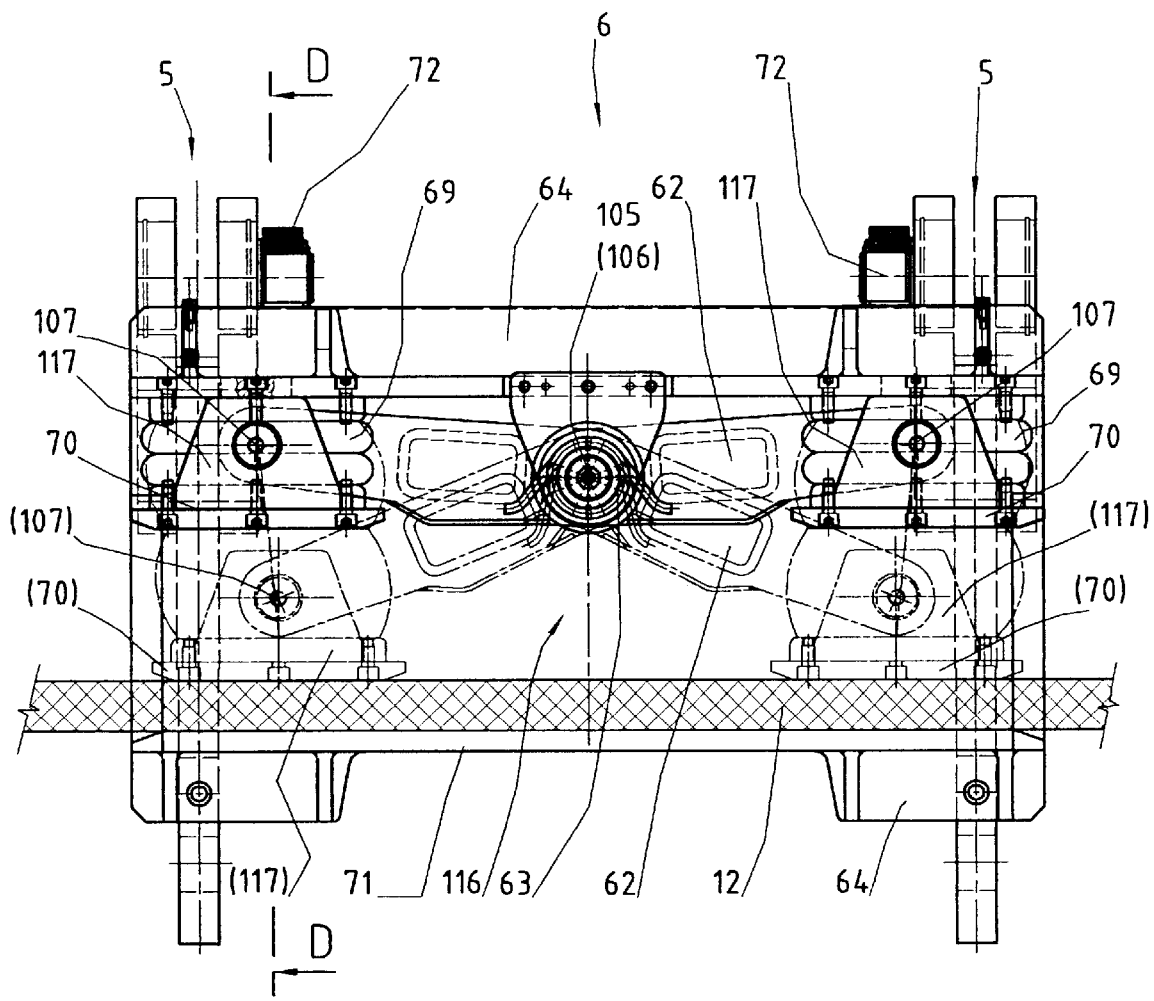
FIG. 12 Clamping unit in the "A" view and in the ground plan.
Figure 13:
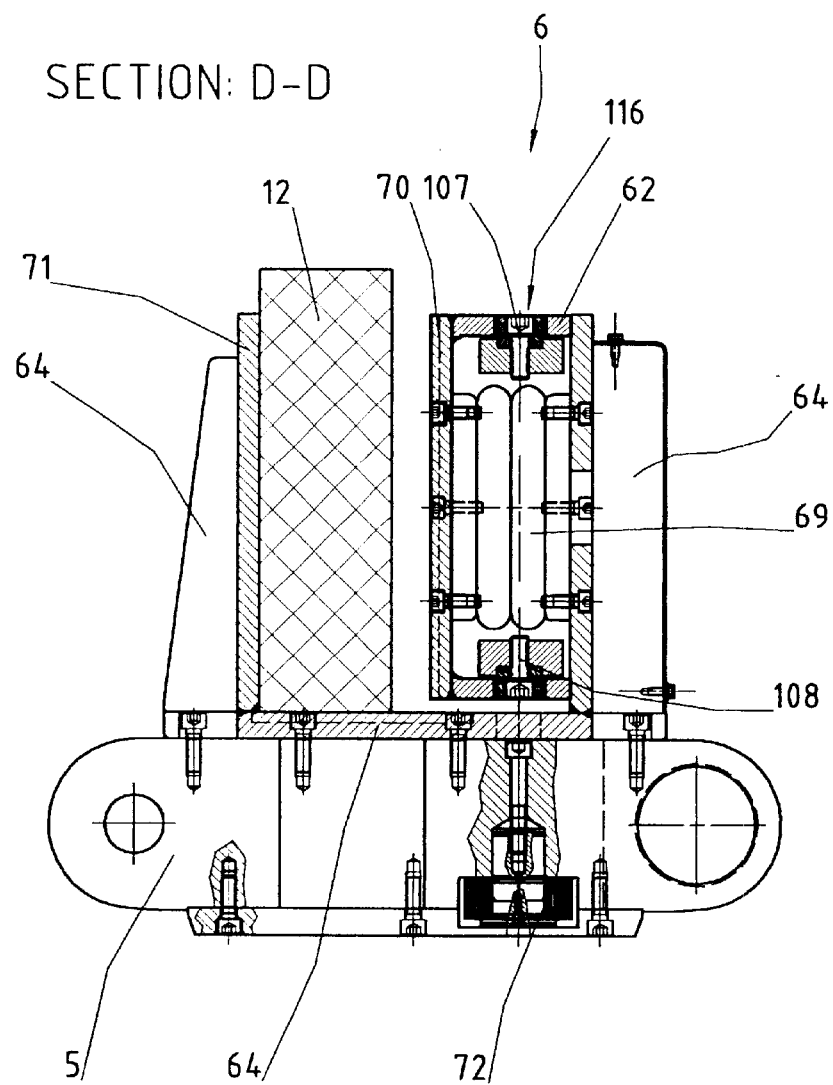
FIG. 13 Clamping unit in the transverse section D—D.
Figure 14:
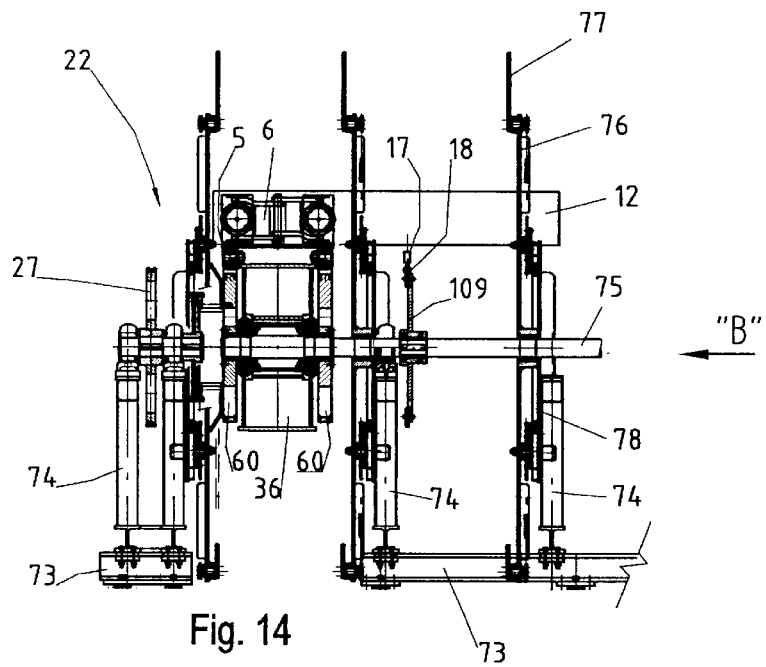
FIG. 14 Exit turnover device with the clamping unit, in a partial longitudinal section; and in the plan view.

As earlier already described in FIG. 2, at the entrance turnover device 3 and perpendicular to it or perpendicular to the drive-shaft 35 there runs the endless conveying chain 5 with clamping units 6, placed on it and fastened along the entire extent in the row and preferentially in the equal interacting distance. They are placed in the transverse direction or parallel to the drive-shaft 35 of the entrance turnover device 3 in the way that one clamping unit 6 is as a rule placed on each link of the endless conveying chain 5. Fixing can be done by optional fixing elements. The above described is presented in FIG. 8 and FIG. 10. In some other construction example they can also be placed and arranged in the row somehow differently. As a rule, to each clamping unit 6 there belongs a pair of the endless conveying chain 5 links, whereby, according to the invention the construction of clamping units 6 fastened to it is characteristic for the machine. As evident from FIG. 10, FIG. 11, FIG. 12 and FIG. 13, each clamping unit 6 is constructed of the unilaterally opened housing 64, inside which there are perpendicular to the endless conveying chain 5 link and in the interacting spacing placed the leaning plate 71, and opposite to it lineally movable clamping mechanism 116, being each separately fixed to the side vertical wall of the housing 64. The clamping mechanism 116 is constructed of the shears-like pair of cranks 62 construction, being with one end radially movably placed on the pin 105 with the return spring 63, which represents its rotating point 106, while with another end in the rotating point 107 or in the rotating point 108 it is movably joined with the clamping cylinder 69 and simultaneously with the girder 117 of the adjacent jaw 70. The rotating point 106 of the clamping mechanism 116 is as a rule positioned in the centre of the housing 64 of the clamping unit 6. Through a pair of girders 118 placed on both ends the pin 105 is fixed to the housing 64. As already above stated, at each of both pair of cranks 62 sides there is placed one clamping cylinder 69 with the adjacent girder 117 and jaw 70. Under each of both clamping cylinders 69 there is placed the guide 65 fixed to the housing 36 of the endless conveying chain 5 and inside the guide 65 there are movably placed its guide bearings 72. On the back side of the guide 65 there are fixed girders 66 with the control filed 67, while control indicators 68 are fixed in the lower portion of the housing 64 of the clamping unit 6 in the way that they are situated a bit over and in the same axis with the control field 67. Each clamping unit 6 is simultaneously through the housing 64 fixed to the endless conveying chain 5. In FIG. 12 the clamping unit 6 is presented in two extreme positions, namely its starting or opened position respectively is marked by a full line, and its operating or closed position respectively by a hatched line.

It is likewise already above described in FIG. 2 that perpendicular to the driveshaft 35 of the entrance turnover device 3 and interactively parallel to each other constructed oblique roller conveyors 38, movably placed inside its housing 43, placed close to adjacent rotating wheels 34, and run in the longitudinal axis line of the endless conveying chain 5 with clamping units 6. It is evident from FIG. 3 that the housing 43 of oblique roller conveyors 38 is of rigid construction and fixed to the oblique binding profile of the housing 33 of the entrance turnover device 3. It is formed by the lower portion constructed of two upright and one lying binding profile, and the upper portion constructed of two a trifle outward tilted upright profiles and of a connecting lying profile, whereby both its portions are rigidly or fixedly joined over both portions upright girders.

In the housing 43 upper portion area, there are at height flexibly and circularly movably placed the knurled roll 88 and smooth roll 89 that are by one end together clamped in the rotating point 96 on the oscillating lever 46 in the way that they interactively limit the internal angle lower than 180°, and they are by the other end joined with the cantilever 94 or cantilever 95 respectively. Cantilevers 94 and 95 are each separately with the opposite end likewise movably joined with the adjacent cylinder 51 to form the rotating point 103 or rotating point 101 respectively with one of them. Cantilevers 94 and 95 are each separately and simultaneously transversely and along the vertical movably inserted inside the slot in the adjacent oscillation stabilizer 97, with the opposite portion fixed to the scarf, a trifle outward tilted housing 43 upright profile. The cylinder 51 that belongs to the cantilever 94 is with its other end movably joined with the girder 48 in the rotating point 100, while the cylinder 51 that belongs to the cantilever 95 is with its other end movably joined with the other girder 48 in the rotating point 98. On the cantilever 94 there is from inside fastened the drive 90, which through the driving chain 92 drives the knurled roll 88, while on the cantilever 95 there is fastened the drive 91, which through the driving chain 92 drives the smooth roll 89. At its free end the knurled roll 88 is also equipped by the guide lug 104 fixed to the front wall of the cantilever 94.

The oscillating lever 46, on which the earlier said rolls 88 and 89 are movably clamped in the rotating point 96, is by its longer side and through the rotating point 93 movably clamped to the hanging girder 119, which is fastened to the housing 43 together with the girder 47 that lies over it. Between the oscillating lever 46 and between the girder 47 there is inserted the cylinder 51 movably joined with them in the way that it forms the joint rotating point 102 with the oscillating lever 46, and the joint rotating point 99 with the girder 47. It follows from the described construction of the oblique roller conveyor 38 that its construction enables movability and flexibility of rolls 88 and 89 in all three points of their clamping, as well as an independent or separated drive of each of them. The above described is presented in FIG. 9.

Figure 8:
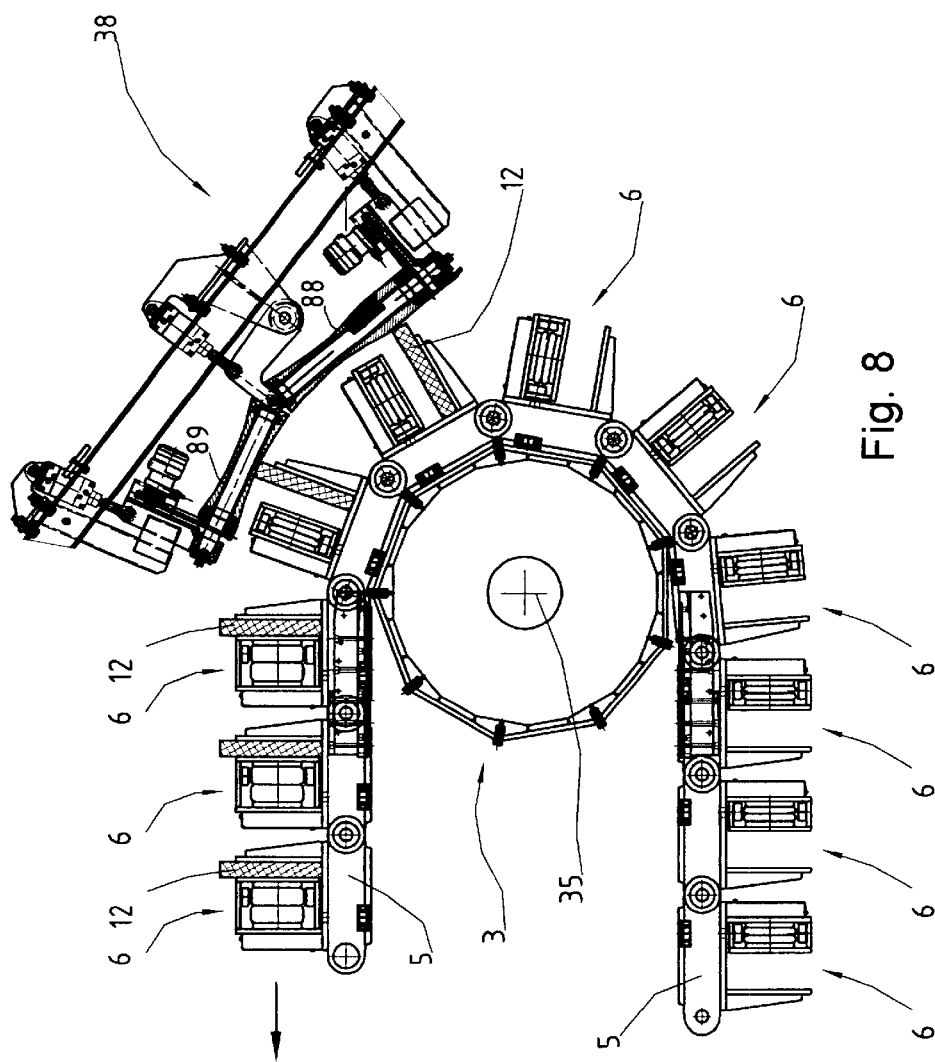
FIG. 8 Entrance turnover device with the endless conveying chain with clamping units and oblique roller conveyor in the side view.
Figure 9:
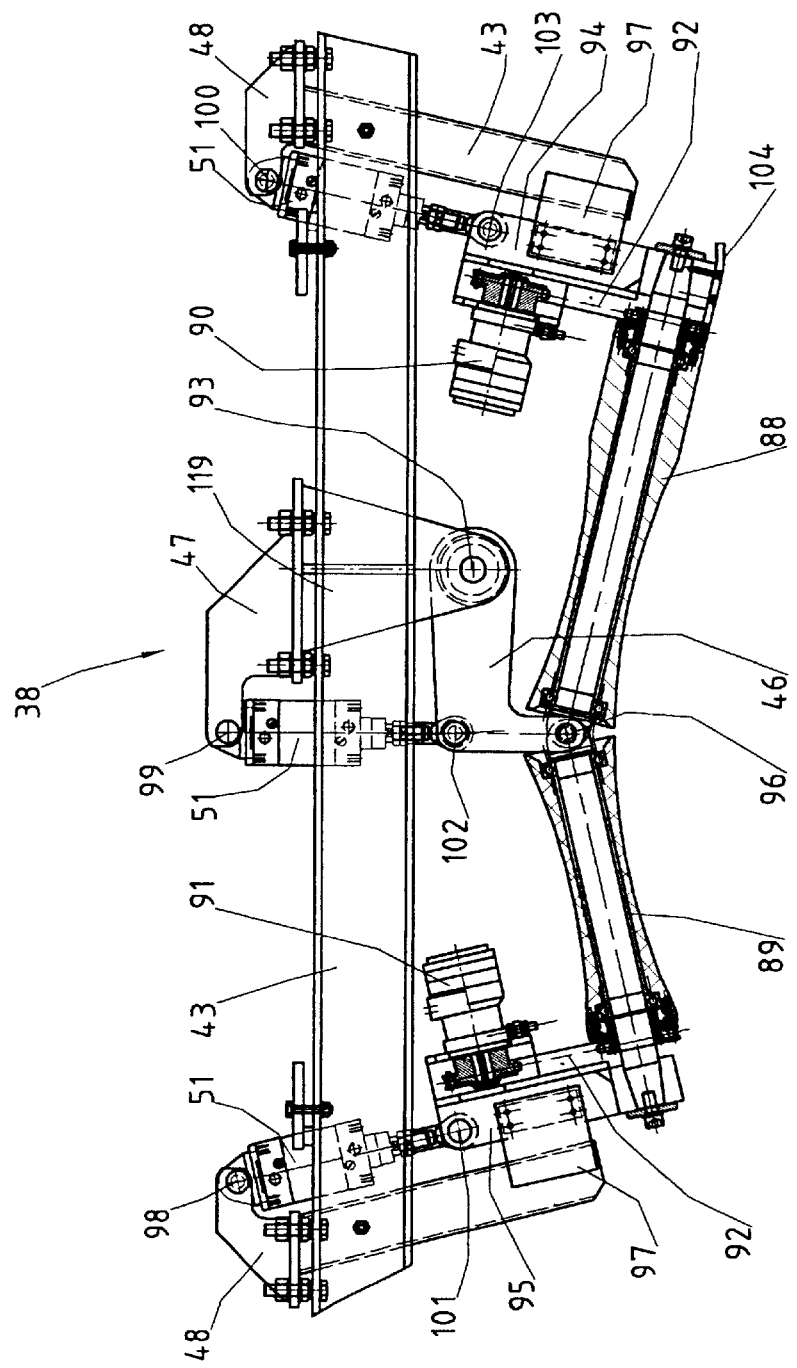
FIG. 9 Oblique roller conveyor in the front view.
Figure 10:
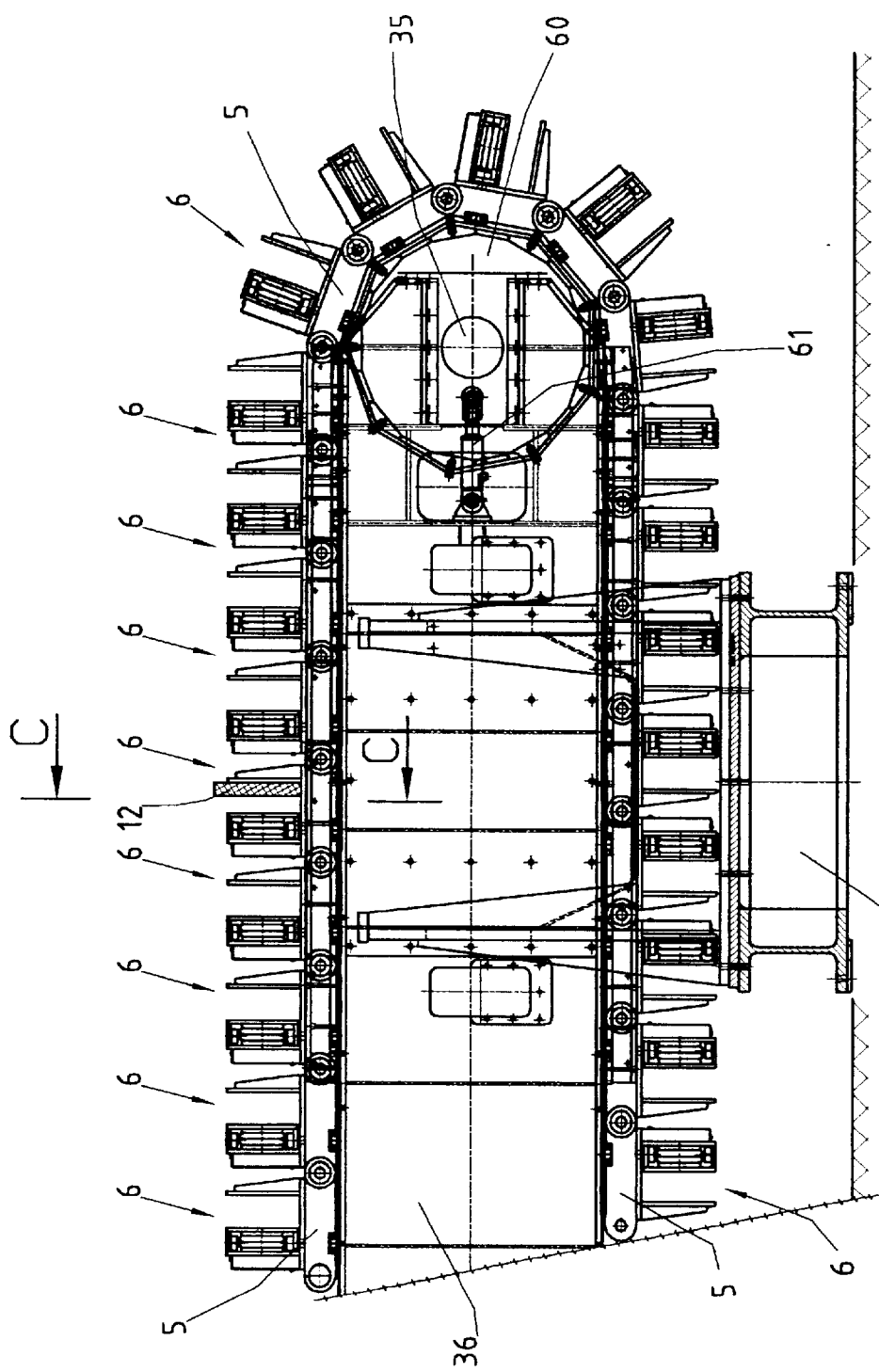
FIG. 10 Same as in FIG. 8, but without the oblique roller conveyor.
Figure 11:
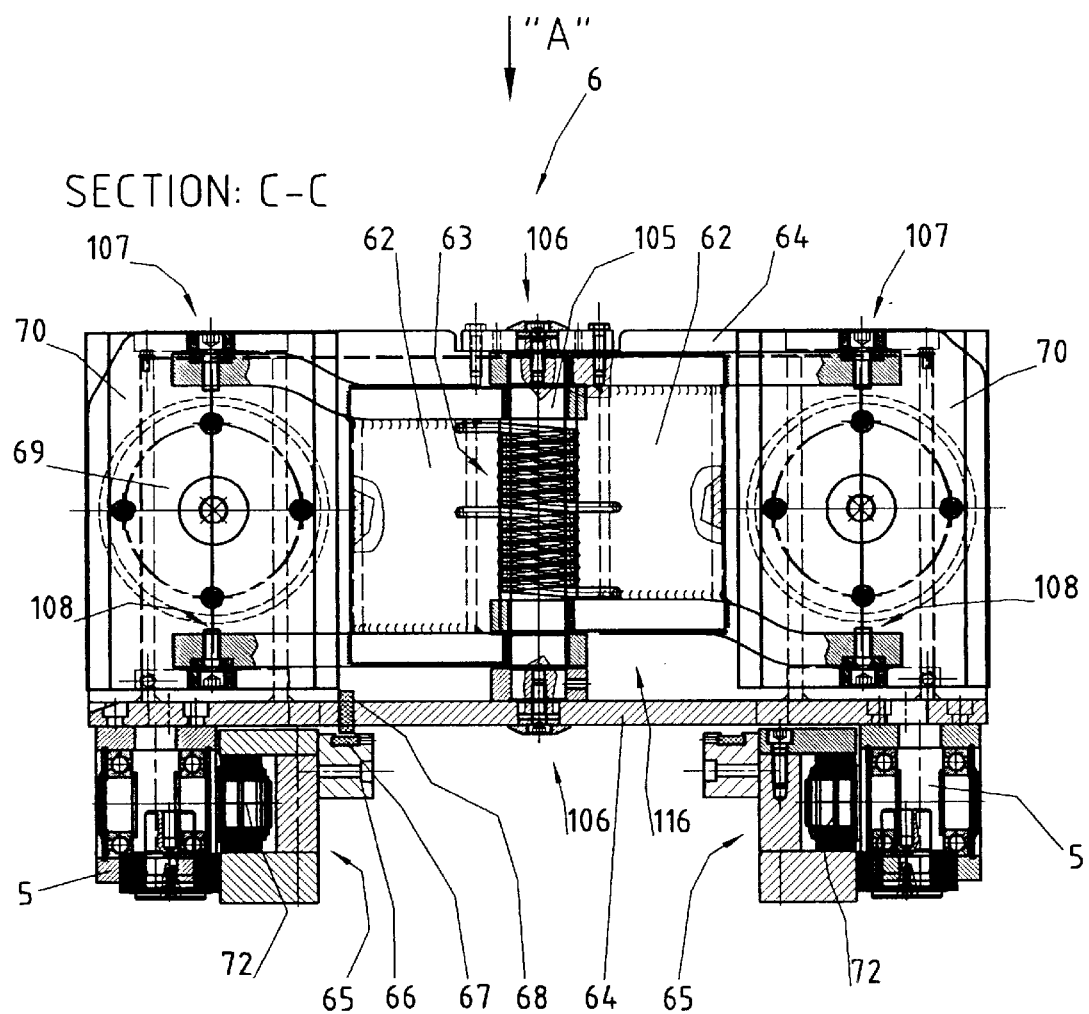
FIG. 11 Clamping unit in the longitudinal section C—C.

The oblique roller conveyor 38 is placed by or over the entrance turnover device 3 in the way that its rolls 88 and 89 are positioned a trifle over clamping units 6 which are fastened to the endless conveying chain 5, and travel by or under the oblique roller conveyor 38, what is presented in FIG. 8.

The drive 44 with all non-presented and unmarked adjacent elements, fastened to the housing 33 of the entrance turnover device, is intended for the oblique roller conveyor 38 height rough adjustment.

Figure 3:
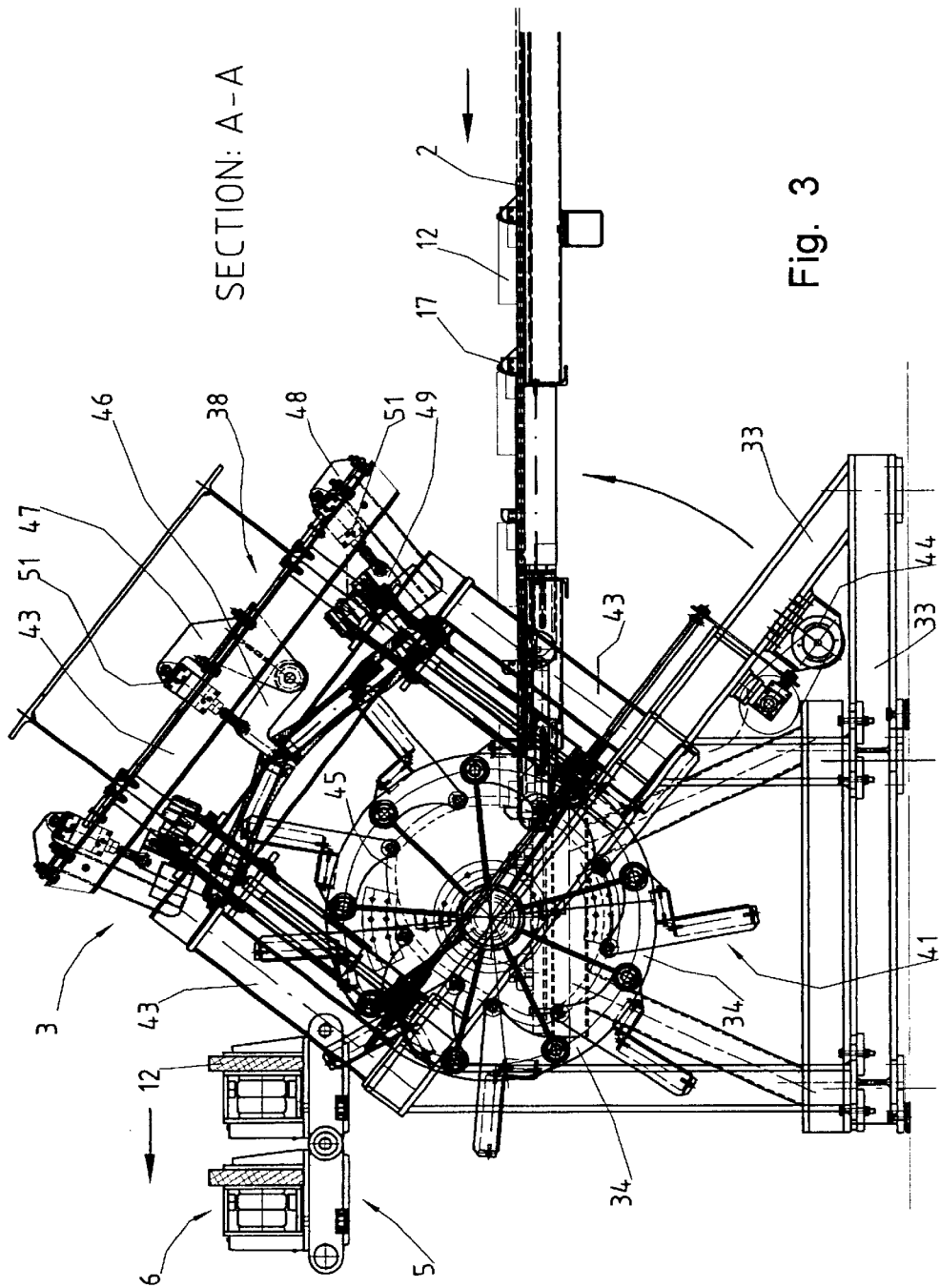
FIG. 3 Entrance turnover device in the transverse section A—A and side view.
Figure 4:
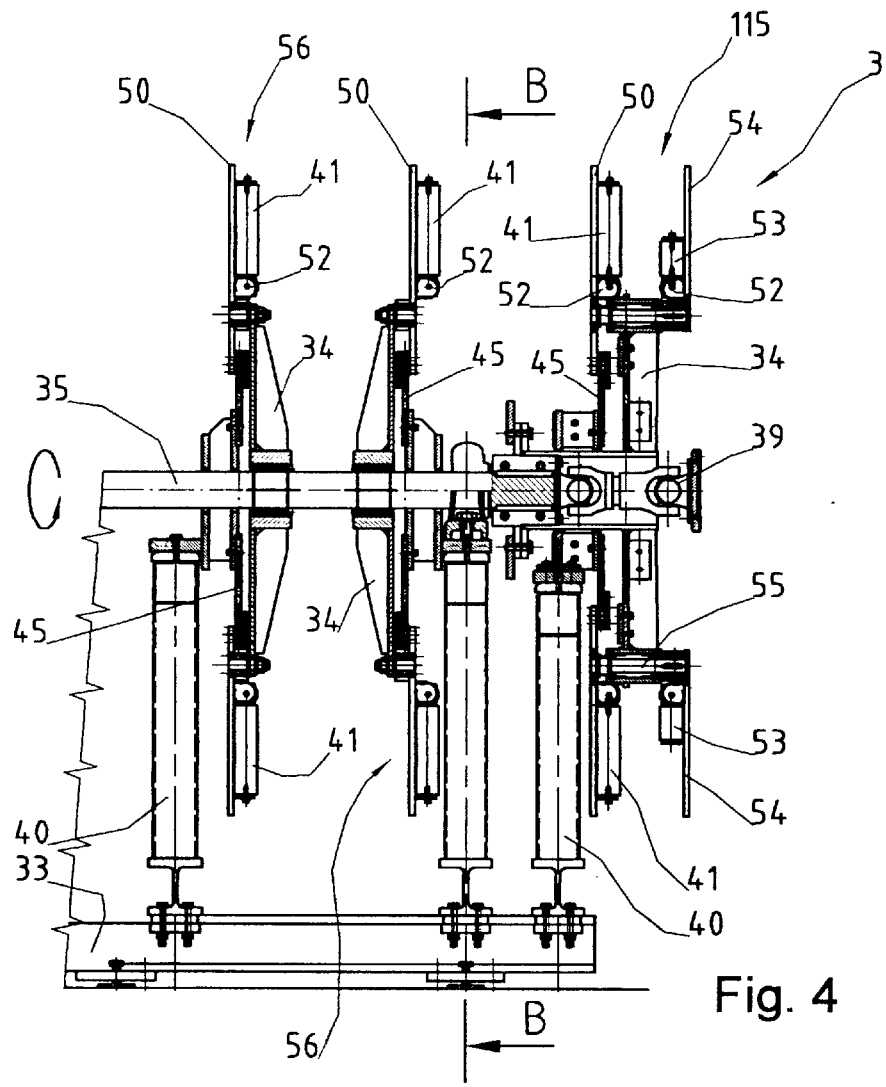
FIG. 4 Entrance turnover device portion in the longitudinal section and plan view.
Figure 5:
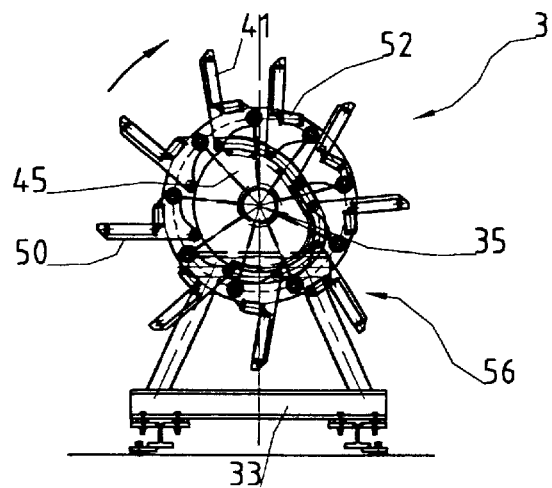
FIG. 5 Entrance turnover device in the transverse section B—B and side view.
Figure 6:
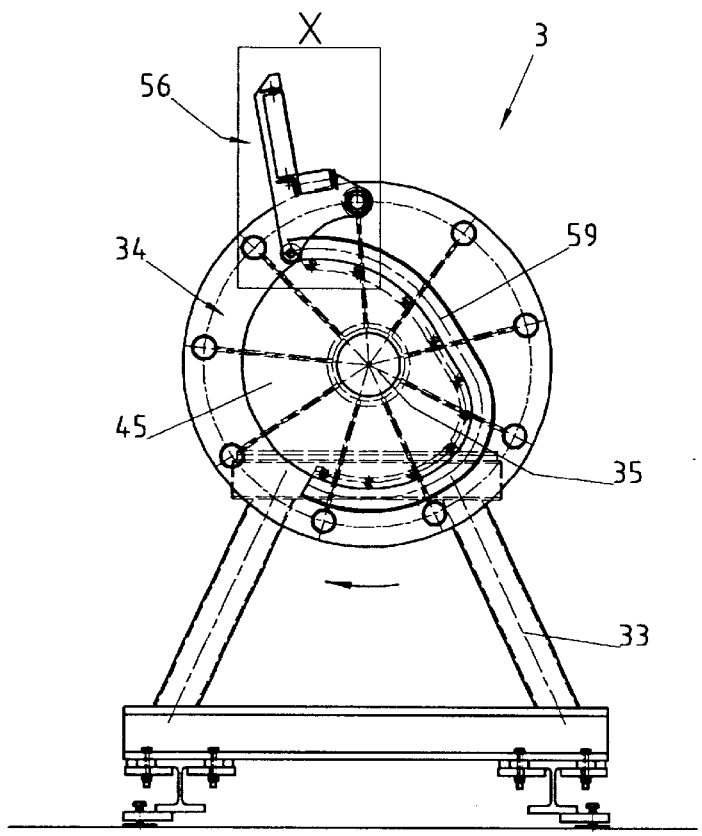
FIG. 6 Rotating wheel of the entrance turnover device in the side front view.
Figure 7:
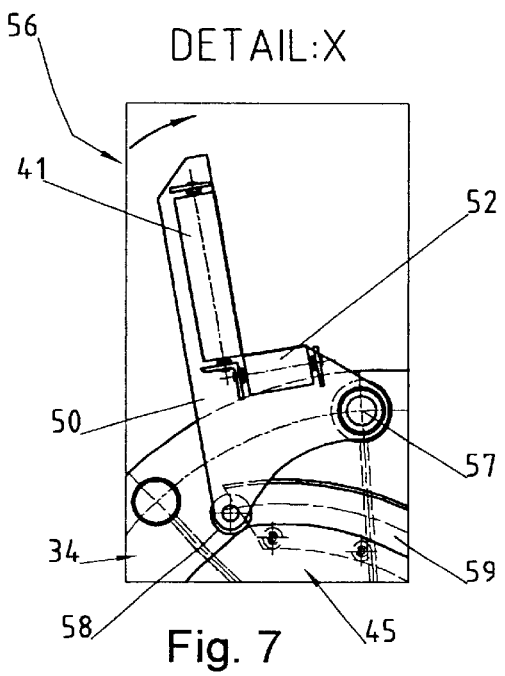
FIG. 7 Bearing coupling on the rotating wheel of the entrance turnover device, in detail "X"

It is also evident from FIG. 3 that the longitudinal conveyor 2 with carriers 17, opposite to the entrance turnover device 3 on the entrance side, is placed in the way that it is situated or runs a trifle under the level of its drive-shaft 35, while the endless conveying chain 5 with clamping units 6 is situated on its exit side over the level of the longitudinal conveyor 2, or more accurately it runs at the level of the bearing coupling 56 on the rotating wheel 34.

In FIG. 14, FIG. 15, FIG. 16 and FIG. 17, there is presented the exit turnover device 22, and as in the introduction already said, according to the invention it is inside the entire machine construction placed transversely between the longitudinal conveyors 18 and 23, it has its own bearing housing 73, and it is driven by the drive 27. It is constructed of the drive-shaft 75, upon which there are in an optional spacing fixed the rotating wheels 76 with bearing cranks 77 along the external periphery, and all together is carried by girders 74, being with the other end fixed to the housing 73 of the exit turnover device 22. On each rotating wheel 76 there is placed one channel guide 78 fixed to the adjacent or scarf girder 74. On the drive-shaft 75 there is in tight fitting placed at least one or more chain wheels 109 for the synchronous drive of the longitudinal conveyor 18 with carriers 17. Inside the intermediate empty space formed by a pair of rotating wheels 76 lying by the drive 27, there is placed the housing 36 with the endless conveying chain 5 with clamping units 6 driven by a pair of chain wheels 60 fixed to the drive-shaft 75. Thus, the drive 27 simultaneously drives the exit turnover device 22 and endless conveying chain 5, what enables their synchronous and non-stroke operation. The above described is presented in FIG. 14.

Figure 15:
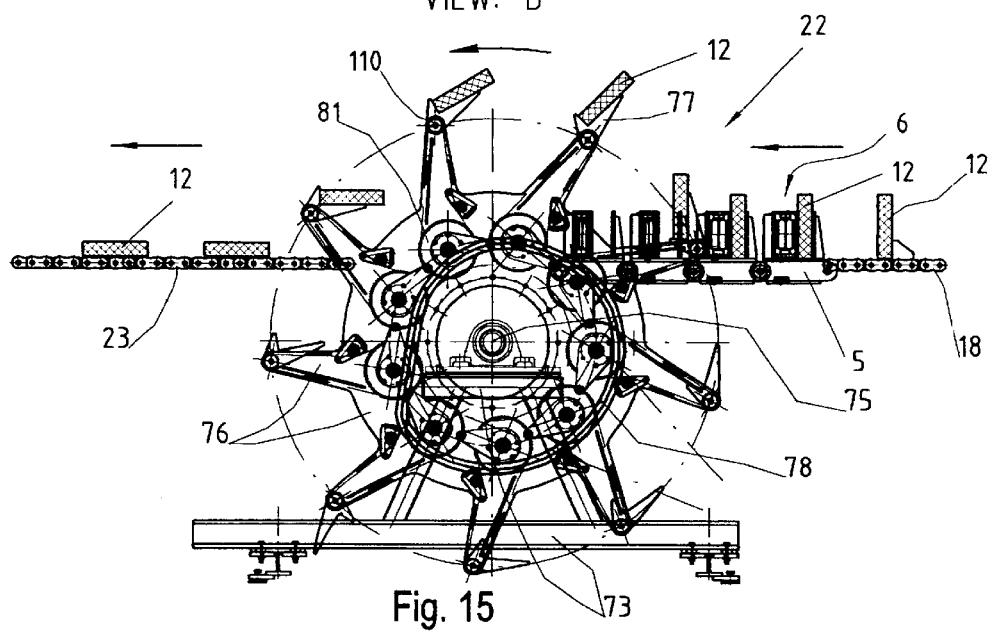
FIG. 15 Exit turnover device with the endless conveying chain with clamping units, in the side front view "B"
Figure 16:
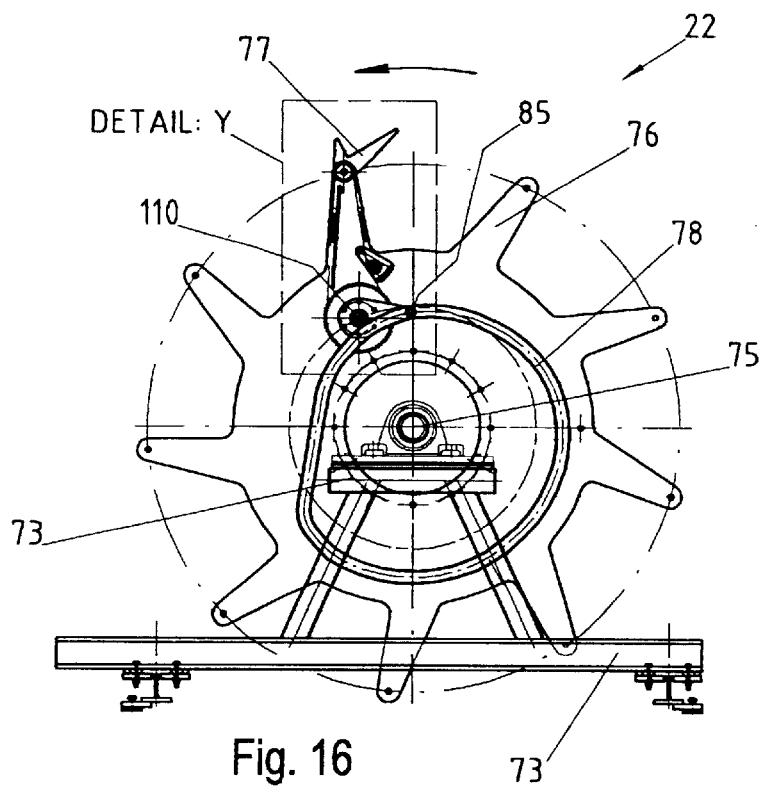
FIG. 16 Rotating wheel of the exit turnover device in the side front view.
Figure 17:
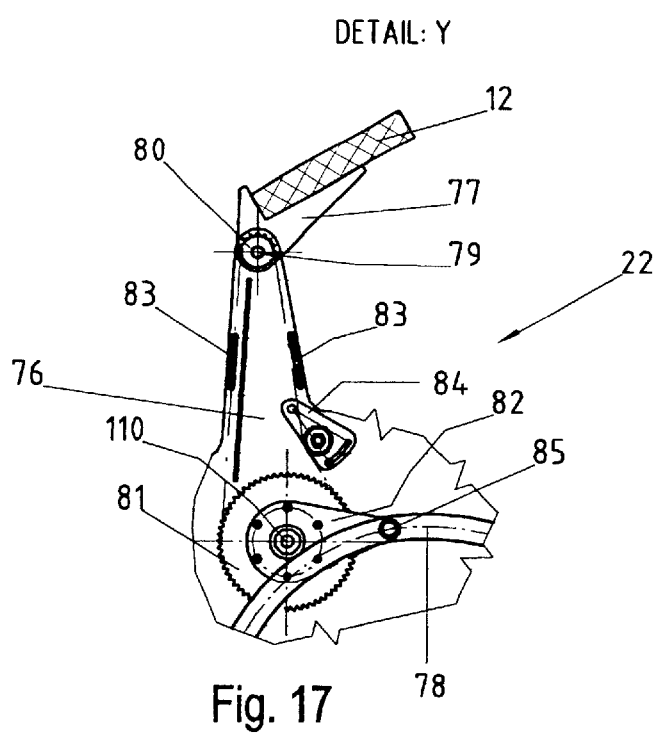
FIG. 17 Bearing coupling and control panel on the rotating wheel of the exit turnover device, in detail >>Y"

It is evident from FIG. 15 and FIG. 16 that rotating wheels 76 are preferentially constructed as a toothed wheel, the teeth of which in the outgrowths form are preferentially of the identical form and height, and are a trifle tilted opposite to the exit turnover device 22 rotating direction. Bearing cranks 77 with the turnover chain wheel 80 are placed upon above described teeth at the top and radially movably fastened in the rotating point 110. Thereby, a rule applies that one bearing crank 77 with the turnover chain wheel 80 belongs to each tooth, and that all rotating points 110 are placed in the same parting circle inside each single rotating wheel 76, being of some larger diameter than the circular body diameter of rotating wheels 76, whereby these parting circles are of equal diameters in all rotating wheels 76. Bearing cranks 77 are preferentially constructed with a rectangular cut turned to the exit turnover device 22 rotating direction.

Inside the other parting circle, being of some smaller diameter than the circular body diameter of rotating wheels 76, there are radially movably placed control chain wheels 81, and thereupon fixed control panels 82 with the guiding bearing 85, so that in the coupling they form joint rotating points 110. Thereby, a rule applies that under each tooth of the rotating wheel 76 with the bearing crank 77 there is placed one coupling of the control chain wheel 81 and control panel 82, and that all their rotating points 110 are placed inside the same parting circle, whereby these parting circles are of equal diameters in all rotating wheels 76. Each bearing crank 77 with its knurled roll 88 and over the chain 83 connected with the adjacent control chain wheel 81 of the control panel 82, what enables their synchronous motion defined by the guided bearing 85 inserted in the channel guide 78. For appropriate stressing of the chain 83 the chain tensioner 84 is intended, being fixedly or movably fastened to the front surface of the rotating wheel 76, or more accurately, at the bottom of the adjacent tooth constructed in it. The above described is more accurately presented in FIG. 17.

As already previously described, the channel guide 78 is placed by the front surface of each rotating wheel 76 inside the exit turnover device 22 and fixed to the girder 74, and it is constructed as an irregular closing curve, inside which there is inserted the guiding bearing 85 of the control panel 82. By rotating the exit turnover device 22, the guiding bearing 85 travels along the entire extent of the channel guide 78, and in this way, through the control chain wheel 81, intermediate chain 83 and turnover chain wheel 80, it defines or alters the bearing crank 77 position, as dictated by the channel guide 78 form. The above described is presented in FIG. 15, FIG. 16 and FIG. 17. Preferentially, each girder 74 simultaneously carries the drive-shaft 75 with rotating wheels 76 and bearing cranks 77, and thereupon channel guides 78 are also fixed, evident from FIG. 14.

Further, the machine for profile working of front surfaces on oblong wood workpieces operation will be described according to the invention. As already stated in the introduction, it is preferentially intended for producing toothed or so-called front wedge joints on both front surfaces of oblong wood workpieces 12 of optional and simultaneously various lengths and intersections for their later series or linear bonding and joining. Naturally, by applying respective working units it is also applicable for all other forms and modes of front profile working, not only of wood, but also workpieces 12 of artificial, metal, and other appropriate materials. According to the invention, in the preferential construction example the description of its operation and procedure will be based on the profile front surface working of workpieces 12 of natural wood. Its basic issue is the presentation in FIG. 1, and for more accurate description other image presentations will also be applied, what will separately be pointed out.

According to the invention, in or on the machine respectively, workpieces 12 come preferentially individually in the row one after another, or in a group of two or more, on rolls 111 on the transverse entrance conveyor 1 by lying on one of their several surfaces, then one after another they are intercepted by carriers 17 of the same conveyor 1, and they move longitudinally between rolls 111 and 112. It is thereby important according to the invention that workpieces 12 of various lengths and various thicknesses, but of the same width or height respectively, are simultaneously front surface worked. By means of rolls 112 that rotate in the opposite direction than rolls 111, and by means of carriers 17, the workpieces 12 on the transverse entrance conveyor 1 are simultaneously moving towards the side guiding lath 13, and in the same time towards the longitudinal conveyor 2, and thus also towards the entrance turnover device 3. Each workpiece 12 captured inside the optional pair of carriers 17, or inside several of them, rowed in the transverse direction of the entrance conveyor 1, is thus with its near front surface leaned against the side guiding lath 13 that is situated by its side edge. In this way, all workpieces 12 that travel towards the longitudinal conveyor 2 are front straightened along with it. After the front straightening along the side guiding lath 13, the workpieces 12 travel in the given series to the longitudinal conveyor 2, and simultaneously under the belt conveyor 14 by its own drive 10, while the conveyors 1 and 2 are driven by the same drive 11. Consequently, under the belt conveyor 14 there is formed a row of interactively and longitudinally joined workpieces 12 pushed by the belt conveyor 14 in the entrance turnover device 3 direction in the way that their longitudinal axes are thus situated parallel to the longitudinal axis of the entrance turnover device 3, which rotates in the longitudinal conveyor 4 direction, and which follows it. Owing to that the workpiece 12, which is situated closest to the entrance turnover device 3, comes to its area or in the area of bearing couplings 56 and 115 on rotating wheels 34 in the way that one larger surface is placed on the leaning roll 41 at the bearing plate 50, and leans against the bearing roll 52. By the entrance turnover device 3 further rotation the workpiece 12 is situated on bearing rolls 52 leaned against leaning rolls 41. Thereby, for an appropriate synchronous adjustment of the bearing couplings 56 and 115 position, it is provided for by the guided bearing 58 on their bearing plate 50, which glides along the formally characteristic guiding plate 45 extent, partially on its external edge, partially inside the groove 59, which in its major extent is rounded up. The radial mobility of bearing couplings 56 and 115 is enabled by the rotating point 57, by which the bearing plate 50 is movably joined with the rotating wheel 34. Each single bearing coupling 115 has two bearing plates 50 and 54 with two pairs of rolls 41 and 52, and 53 and 52, with the purpose to make the position inside the entrance turnover device 3 more stable. When the workpiece 12 travels with the entrance turnover device 3 towards some higher level, where there is situated the endless conveying chain 5 with clamping units 6, it lies inside bearing couplings 56 and 115 in the upright position, as on this route the workpiece 12 is turned by 90°. On this route the workpiece 12 also simultaneously travels under the oblique roller conveyor 38, which lies a trifle over bearing couplings 56 and 115 of the entrance turnover device 3, and at the same time also over clamping units 6 on the endless conveying chain 5. Thereby, the oblique roller conveyor 38 with the smooth roll 89 provides a stable position of the workpiece 12 inside the entrance turnover device 3, and at the same time it pushes it on the upper level by the knurled roll 88 into the area of the nearest clamping unit 6 on the endless conveying chain 5, which is through the chain wheel 60 driven by the drive 15. The chain tensioner 61 is applied for endless conveying chain 5 tensioning. The above described is evident from FIG. 2 to FIG. 10, and is efficient for an optional number of workpieces 12 that in this procedure follow each other in the regular sequence, and the procedure is fluent and runs synchronously.

For providing fluent, thus non-stroke and synchronous operation of the machine according to the invention, the drive 15 simultaneously drives through the drive-shaft 35 of the entrance turnover device 3 also the longitudinal conveyor 4 and the endless conveying chain 5 with clamping units 6, and through it the longitudinal conveyor 18, placed further on. Drives 11 and 15 are likewise synchronously harmonized.

When one end of the workpiece 12 travels in the upright position and according to the previously described mode into one of several clamping units 6, which are in the row fastened to the endless conveying chain 5, then the straightening roll 32 pushes its front surface to the side guiding lath 86 and positions it inside the clamping unit 6, while its other opposite longer portion lies between adjacent carriers 17 on the longitudinal conveyor 4. Then the clamping mechanism 116 pushes it to the leaning plate 71 and rigidly clamps it inside the clamping unit 6.

For punctual opening and closing of the clamping mechanism 116 inside the clamping unit 6, there are applied the control field 67 and the control indicator 68 inside the girder 66 fastened to the guide 65 of the endless conveying chain 5, whereby the control indicator 68 is inserted through the housing 64 of the clamping unit 6 in the way that it slightly juts out. When the straightening roll 32 pushes the end of the workpiece 12 situated in this part against the side guiding lath 86, the control indicator 68 actuates the clamping mechanism 116 operation, whereby it activates the clamping cylinders 69, which then push the girder 117 with the jaw 70 to the leaning plate 71. In this way both jaws 70 push the workpiece 12 to the leaning plate 71 and rigidly clamp it. The shears-like mechanism formed by two cranks 62 is applied for symmetrical operation of both jaws 70 on the workpiece 12. The clamping units 6 opening procedure runs in the opposite order, and it is also signaled by the control indicator 68.

The workpiece 12 in the upright position, unilaterally rigidly clamped in the clamping units 6 on the endless conveying chain 5, and with the other longer end inserted between carriers 17 of the longitudinal conveyor 4, in the transverse position and straight direction, it travels further to and then along working units constructed by the circular saw 7, profile miller 8 and glue depositor 9, all placed in the series row. The circular saw 7 first straighten the front surface of the scarf end of the workpiece 12, the profile miller 8 mills in it a toothed or wedge profile of an optional form, and then the glue depositor 9 deposits the appropriate glue on this wedge profile. Thus, the profiled front surface of this end of the workpiece 12 is prepared for front joining with the following workpiece 12.

After the earlier described working of one front surface of the workpiece 12 in the stated working units that preferentially have each its drive and are placed along the endless conveying chain 5 with clamping units 6 that runs along the longitudinal conveyor 4, the workpiece 12 lineally travels on in the equal position towards next working units, as there follows the front side profile working on its opposite end. On this route the clamping unit 6 sets free until then rigidly clamped end of the workpiece 12 in the way that it can again move in the transverse direction on the longitudinal conveyor 4, or in its longitudinal axis direction. When the workpiece 12 comes to the end of the longitudinal conveyor 4, the oblique conveyor 16 with carriers 28 and drive 113 starts pushing it at its rough end from the longitudinal conveyor 4 area to the area of the longitudinal conveyor 18 with carriers 17, whereby it pushes the already worked end of the workpiece 12 out from the clamping unit 6 on the endless conveying chain 5, and pushes its still rough end in it. In this case the workpiece 12 travels simultaneously both in the longitudinal and transverse direction as to longitudinal conveyors 4 and 18. As workpieces 12 are mainly of various lengths, they require front straightening at their rough end before re-working.

The workpiece 12 travels linearly along the longitudinal conveyor 18 further to the straightening roll 37. Thereby, its rough end is placed in the non-activated clamping unit 6 on the endless conveying chain 5, while its other longer partition with the worked end lies inside the adjacent pairs of carriers 17 on the longitudinal conveyor 18, and is movable in its longitudinal axis direction. When the workpiece 12 comes to the straightening roll 37 area, it pushes the workpiece 12 still rough end against the side guiding lath 29 and straightens it front, then the clamping unit 6 in this part of the endless conveying chain 5 rigidly clamps the workpiece 12 in the way previously described in working units 7, 8 and 9. There follows working of this workpiece 12 rough end in one after another placed working units, circular saw 19, profile miller 20, and glue depositor 21 in the way and according to the procedure equal to the above described at the longitudinal conveyor 4. After concluded working the clamping unit 6 sets free the workpiece 12, which then in the upright position comes to the exit turnover device 22.

When the workpiece 12 comes to the exit turnover device 22 area, it is taken over by bearing cranks 77 on rotating wheels 76, and on the circular route they turn it by 90° in the way that it passes over from the upright position to the longitudinal conveyor 23 in the lying position, wherein the workpiece 12 lies on one of its larger surface. Thereby, the position of bearing cranks 77 is straightened or simultaneously adjusted by the guided bearing 85, which glides inside the channel guide 78 and follows its form and transmits its motion to bearing cranks 77 through the control panel 82, control chain wheel 81, and turnover chain wheel 80, by which it is connected with the chain 83.

When the workpiece 12 comes from the exit turnover device 22 to the longitudinal conveyor 23, it is frontal worked on both its ends and prepared for series or longitudinal joining of profile constructed front surfaces with workpieces 12, which they follow in series. After the longitudinal conveyor 23, the workpiece 12 comes under the belt conveyor 31 driven by the drive 25 with a speed a trifle higher than the speed of the longitudinal conveyor 23. With this increased speed the workpiece 12 comes to the roller conveyor 24, which lies transversely to the longitudinal conveyor 23. By means of the drive 26 and pressing conveying wheel 30 it conveys the workpiece 12 to the non-presented device for front joining and gluing these joints, being not the subject of this invention. By means of the roller conveyor 24 the workpiece 12 travels towards its longer longitudinal axis, what is opposite to its previous motion through the machine, according to the invention, when it traveled transversely or in its transverse axis direction.

What is claimed is:

1. Machine for profile working of front surfaces on oblong wood workpieces, the machine comprising: a transverse entrance and exit roller conveyor and an intermediate feed line conveyor driven by means of an endless conveying chain, inside of the intermediate feed line conveyor there is placed a rotating device for turning over the workpieces, and constructed of a drive-shaft fastened with rotating wheels, and along with the intermediate feed line conveyor there are side guiding laths for front straightening of the workpieces, also along the intermediate feed line conveyor are fixed working units, by which the workpieces move lineally in a direction so that the workpieces lie perpendicular to the working units, and the workpieces are thereby rigidly clamped in a clamping unit, whereby the working units are formed by a circular saw and profile miller in a given series, constructed bearing couplings are arranged along an entire extent of the rotating wheels of the entrance turnover device, the constructed bearing couplings have rotating leaning rolls inside a bearing plate, at least on one rotating wheel, there are likewise along the entire extent constructed bearing couplings with two pairs of rotating leaning rolls and inside bearing plates, which are circularly movably fastened on the rotating wheels at a rotating point, with a guided bearing is movably and guidable placed by an external edge of a guiding plate or inside it's a groove which round up the guiding plate on its major extent, whereby there is at one rotating wheel constructed at least one guiding plate; in which the endless conveying chain runs between longitudinal conveyers with carriers has at least one clamping unit, which is longitudinally limited by at least two distant one from another and fixedly positioned vertical ribs, whereby at one there is fastened a fixed leaning plate, and opposite to it there is fastened a clamping mechanism with a pair of shears-like constructed cranks, which are with one of its end radially movably and through a pin rounded up by a return spring joined in a joint rotating point, and with the other end they are likewise radially movably, but separately and through the rotating point joined by at least one clamping cylinder with a jaw, while on the opposite side of a housing basic plate of the clamping unit there is placed a mirror-inverted fixed pair of side guides with inserted guide bearings of the endless conveying chain, and from an external side there is upon the side guides fixed a girder with at least one control field and control indicator adjacent to it; an oblique roller conveyor with a housing is placed in the entrance turnover device area, and over clamping units on the endless conveying chain, inside the oblique roller conveyor there are flexibly and circularly movably inserted at least one knurled roll and at least one smooth roll in a way that their longitudinal axes limit an internal angle, whereby their ends are together rotationally and flexibly joined in a rotating point by an oscillating lever, which is through the rotating point radially movably joined with the girder, and through the rotating point radially and lineally movably joined with the cylinder fastened to the girder in the rotating point, while by the opposite end the rolls are likewise rotationally and flexibly joined with cantilevers which are in the longitudinal and transverse direction flexibly inserted in an adjacent oscillation stabilizer, whereby the knurled roll is driven by its own drive, and the smooth roll is driven by its own drive; in which the rotating wheels of the exit turnover device are constructed in a chain wheel form with toothed outgrowths placed all over the rotating wheel, under an angle tilted in a direction opposite to the rotation, whereby there is on of each toothed outgrowth and in the rotating point radially movably fastened at least one bearing crank, which is through an endless chain connected with a control chain wheel, upon which there is fixed at least one control panel and is together with it circularly movably fastened to the rotating wheel basic plate in the rotating point in a way that they are positioned under the toothed outgrowth, and that the movable bearing placed on the top of the control panel is rotationally and guidably inserted inside a channel guide, which is placed on one of larger surfaces of the rotating wheel and parallel to it, and that it is fixed on the girder.

2. The machine according to claim 1 wherein: the entrance conveyor, longitudinal conveyors, and roller conveyor lie interactively at a same height, and they run in a same plane respectively, which is lower than the height of longitudinal conveyors, and the endless conveying chain, whereby the endless conveying chain, the longitudinal conveyors likewise lie interactively at a same height and run in a same plane.

3. The machine according to claim 1 wherein: a number of bearing couplings and a number of bearing couplings on adjacent rotating wheels inside the entrance turnover device are equal.

4. The machine according to claim 1 the leaning rolls inside the bearing plate, bearing coupling on the entrance turnover device lie one against the other preferentially under a right angle.

5. The machine according to claim 1, wherein: all rotating points are constructed inside a same parting circle that is placed under an external circular edge of the rotating wheels of the entrance turnover device in a spacing from one to another.

6. The machine according to claim 1, wherein: the guiding plate of the entrance turnover device is to a major extent a regular circular, and to a minor extent of an irregular radial form, and of equal form is also the groove in the portion where it rounds up the guiding plate, whereby all guiding plates are preferentially of equal form and dimensions, and they are of the form that is completely the same as the channel guides form on the exit turnover device.

7. The machine according to claim 1, wherein: the cranks of the clamping mechanism on the clamping unit with both adjacent clamping cylinders are joined through the girder, on which the rotating point is also placed.

8. The machine according to claim 1, wherein: the endless conveying chain with clamping units runs from the entrance turnover device to the exit turnover device in a way that it rounds them up.

9. The machine according to claim 1, wherein: the cantilevers with both adjacent cylinders lie preferentially perpendicular to the longitudinal axis of the adjacent knurled roll or smoothed roll respectively of the roller conveyor, and are through rotating points by their one end lineally movably joined with at least one adjacent cylinder, whereby the cylinders are through the rotating points movably joined with the adjacent girder.

10. The machine according to claim 1, wherein: on the external end of the knurled roll of the roller conveyor constructed the guide lean with an upwards bent external edge.

11. The machine according to claim 1, wherein: the oblique roller conveyor is adjustable by height through the drive, and its housing is fixed to the housing of the entrance turnover device.

12. The machine according to claim 1, wherein: the girders are with one end fixed to the housing of the exit turnover device.

13. The machine according to claim 1, wherein: the bearing crank has a cutting, which is on the rotating wheels turned to the direction of the exit turnover device rotation.

14. The machine according to claim 1, wherein: to each endless chain there belongs at least one chain tensioner fastened to the rotating wheel of the exit turnover device.

15. The machine according to claim 1, wherein: the channel guide of the exit turnover device is to major extent of a regular circular, and to a minor extent of an irregular radial form, and is of a form identical to the guiding plate form of the entrance turnover device.

16. The machine according to claim 1, wherein: the rotating points are constructed to an entire extent of a same parting circle on the circular rotating wheel basic plate of the exit turnover device, and a distance between them is equal.

17. The machine according to claim 1, wherein: the longitudinal conveyors are equipped with carriers running simultaneously in the longitudinal and transverse direction.

18. The machine according to claim 1, wherein: a free edge of the longitudinal conveyor and under an angle there is constructed an oblique conveyor with carriers, which runs in a direction of the longitudinal conveyor.

19. The machine according to claim 1, wherein: after the circular saw and profile miller there is placed at least one glue depositor.

20. The machine according to claim 1, wherein: the drive simultaneously and synchronously drives the entrance turnover device, longitudinal conveyor, and endless conveying chain with clamping units, and indirectly through it the longitudinal conveyor, whereby its operation is also synchronously adjusted to the drive, which drives the entrance conveyor and longitudinal conveyor.

21. The machine according to claim 6 wherein: each guiding plate is fixed to at least one girder, which is by a pedestal joined with the housing, and which simultaneously carries an entire construction of the entrance turnover device.

* * * * *